United States Patent [19]

Saito et al.

[11] Patent Number: 5,153,807
[45] Date of Patent: Oct. 6, 1992

[54] SELF-TUNING CONTROLLER APPARATUS AND PROCESS CONTROL SYSTEM

[75] Inventors: Tadayoshi Saito, Hitachiota; Susumu Takahashi, Higashiibaraki; Kouji Tachibana, Katsuta; Junzo Kawakami; Nobuyuki Yokokawa, both of Mito, all of Japan

[73] Assignee: Hitachi, Ltd., Tokyo, Japan

[21] Appl. No.: 714,344

[22] Filed: Jun. 12, 1991

Related U.S. Application Data

[63] Continuation of Ser. No. 409,140, Sep. 19, 1989, abandoned.

[30] Foreign Application Priority Data

Sep. 21, 1988 [JP] Japan .................. 63-234994
Jan. 13, 1989 [JP] Japan .................. 1-004928

[51] Int. Cl.$^5$ .......................................... G05B 13/02
[52] U.S. Cl. .................................. 364/165; 364/157; 364/158; 364/162
[58] Field of Search .......................... 364/157–165

[56] References Cited

U.S. PATENT DOCUMENTS

| Re. 33,267 | 7/1990 | Kraus | 364/158 |
| 4,602,326 | 7/1986 | Kraus | 364/158 |
| 4,881,160 | 11/1989 | Sakai et al. | 364/161 |
| 4,882,526 | 11/1989 | Iino et al. | 318/561 |
| 4,903,192 | 2/1990 | Saito et al. | 364/157 |

FOREIGN PATENT DOCUMENTS

0241286 10/1987 European Pat. Off.

OTHER PUBLICATIONS

Hitachi Review, "A Single Loop Controller with Auto-Tuning System Using the Expert Method"; vol. 36, No. 6, 1987; K. Tachibana et al.
Proceedings of the 24th IEEE Conference on Decision & Control, "Fuzzy PID Supervisor"; vol. 1, Dec. 1985; H. R. Nauta Lemke et al.
Journal A, "Intelligent Knowledge-Based System for Adaptive PID Controller"; vol. 27, No. 3, Jul. 1986; A. Carmon.

Primary Examiner—Jerry Smith
Assistant Examiner—Paul Gordon
Attorney, Agent, or Firm—Antonelli, Terry, Stout & Kraus

[57] ABSTRACT

A self-tuning controller apparatus which comprises: a control response pattern recognition portion for receiving a set-point and a controlled variable of a process and for obtaining three performance indexes from a controlled variable response pattern generated in response to a change in the set-point or a disturbance; a control parameter correction portion for qualitatively evaluating the three performance indexes and for inferring a correction value of a PID control parameter on the basis of the result of evaluation; and a control performance dissatisfaction degree evaluation portion for evaluating the inferred correction value of the PID control parameter in accordance with the dissatisfaction degrees of the two performance indexes for the respective target specifications of the two of the three performance indexes. The control performance dissatisfaction degree evaluation portion acts to make the PID control parameter converge stably. In a process control system including a plurality of vertically distributed control elements each capable of self-tuning its control parameter, the control performance dissatisfaction degree evaluation portion contributes to autonomous functioning of each of the control elements.

38 Claims, 13 Drawing Sheets

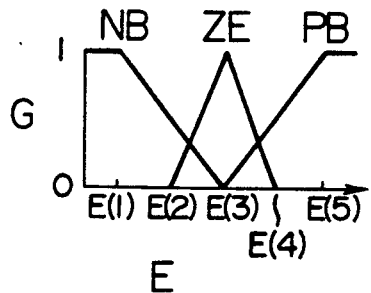
FIG. 4
(PRIOR ART)
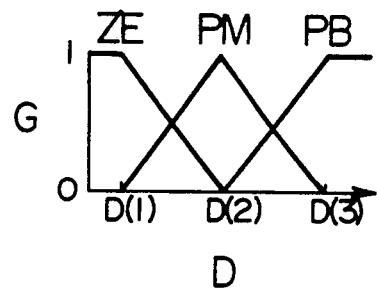
FIG. 5
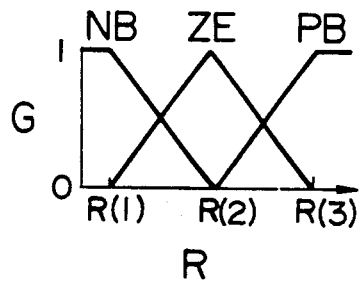
FIG. 6
(PRIOR ART)
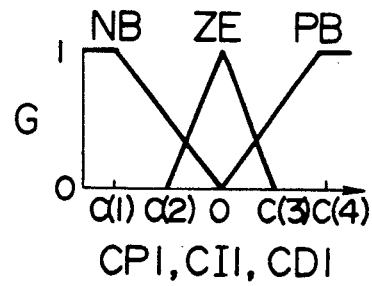
FIG. 8
FIG. 7
|   | E  | D  | R  | CPI | CII | CDI |
|---|----|----|----|-----|-----|-----|
| 1 | PB | PB | —  | NB  | ZE  | NB  |
| 2 | PB | PM | PB | NB  | NB  | ZE  |
| 3 | PB | PM | ZE | ZE  | ZE  | PB  |
| 4 | PB | PM | NB | PB  | PB  | PB  |
| 5 | PB | ZE | PB | NB  | ZE  | ZE  |
| 6 | PB | ZE | ZE | ZE  | PB  | ZE  |

F I G. 11
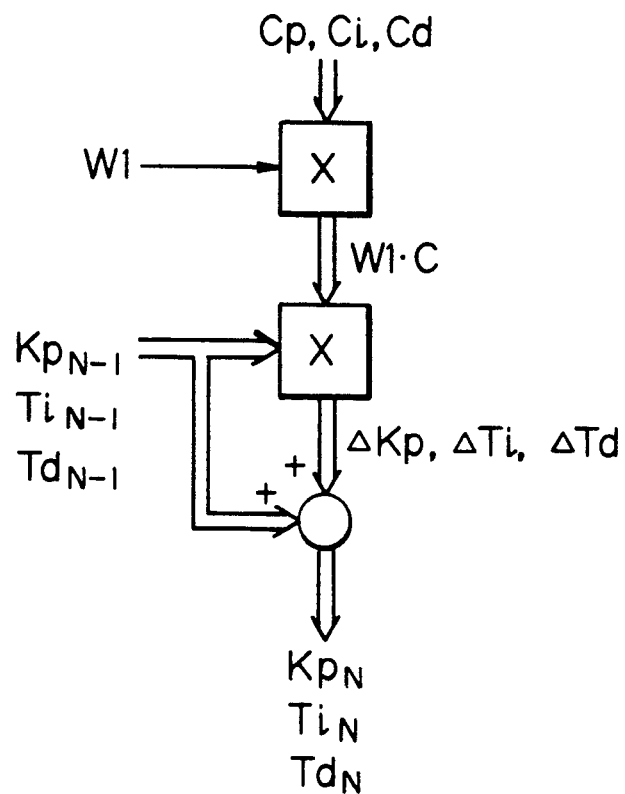
F I G. 13
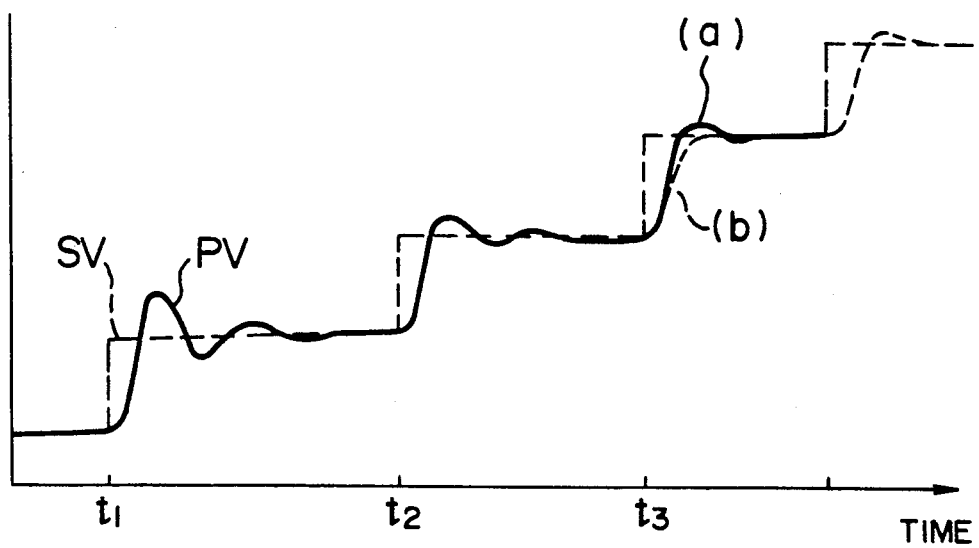

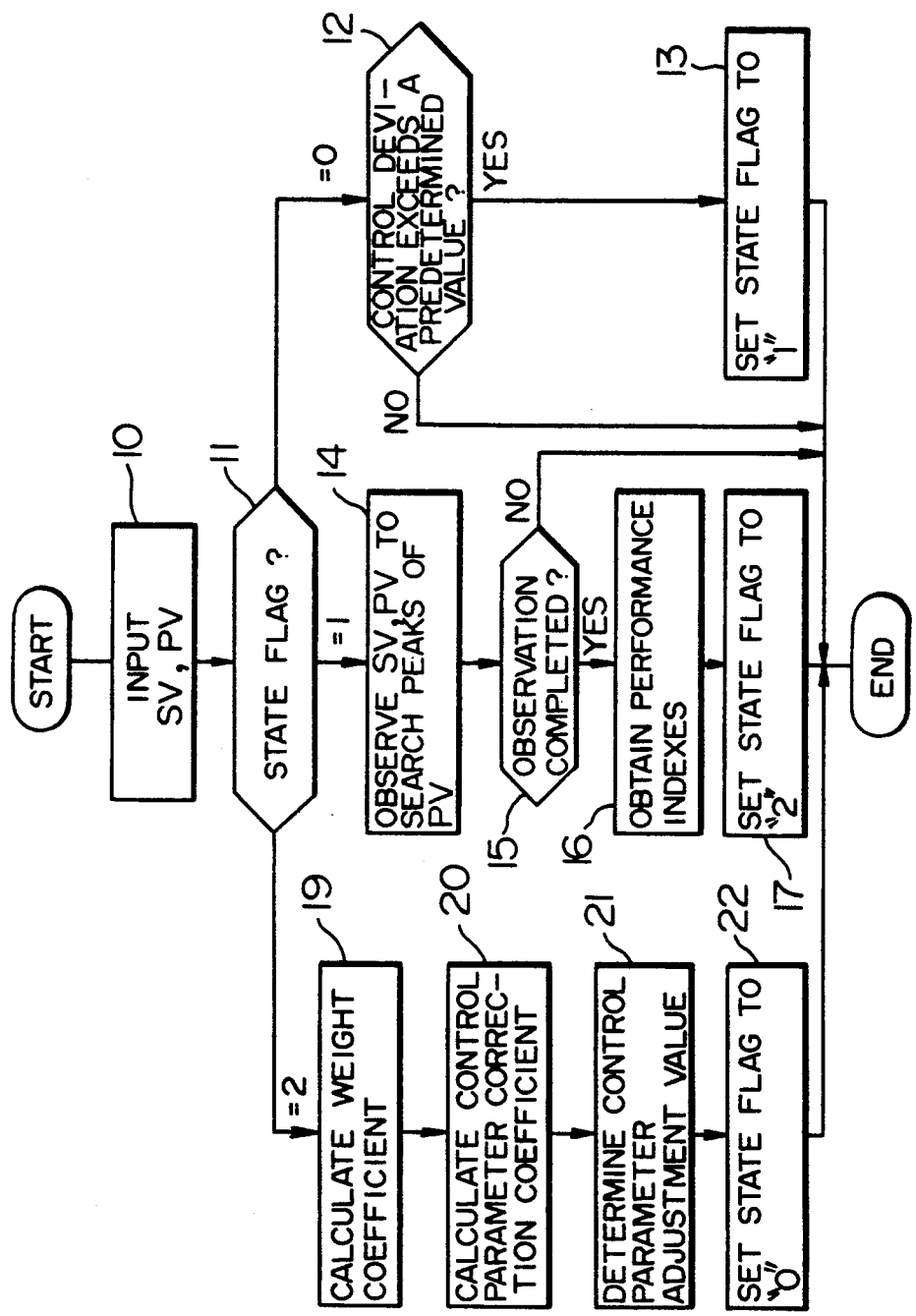

FIG. 20A
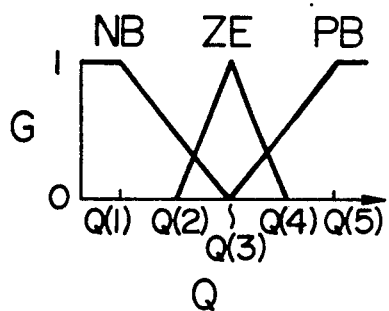
FIG. 20B
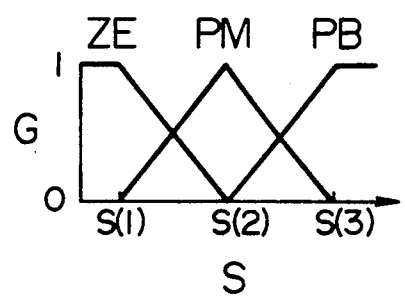
FIG. 21
| | S | Q | CP2 | CI2 |
|---|---|---|---|---|
| 1 | PB | PB | NB | PB |
| 2 | PM | PB | NB | ZE |
| 3 | ZE | PB | NB | NB |
| 4 | PB | ZE | ZE | PB |
| 5 | PM | | | ZE |
FIG. 22
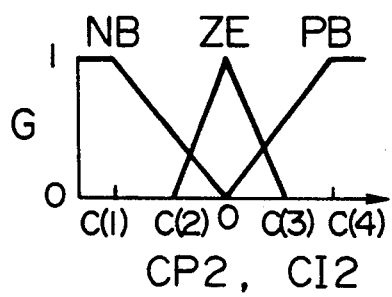

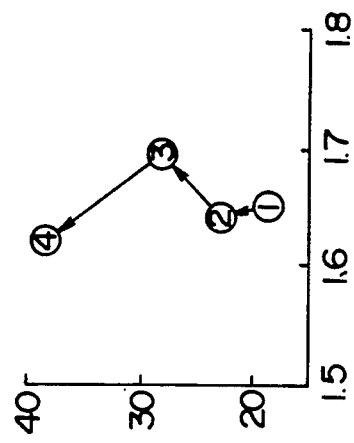
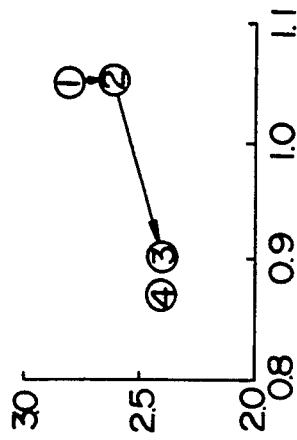
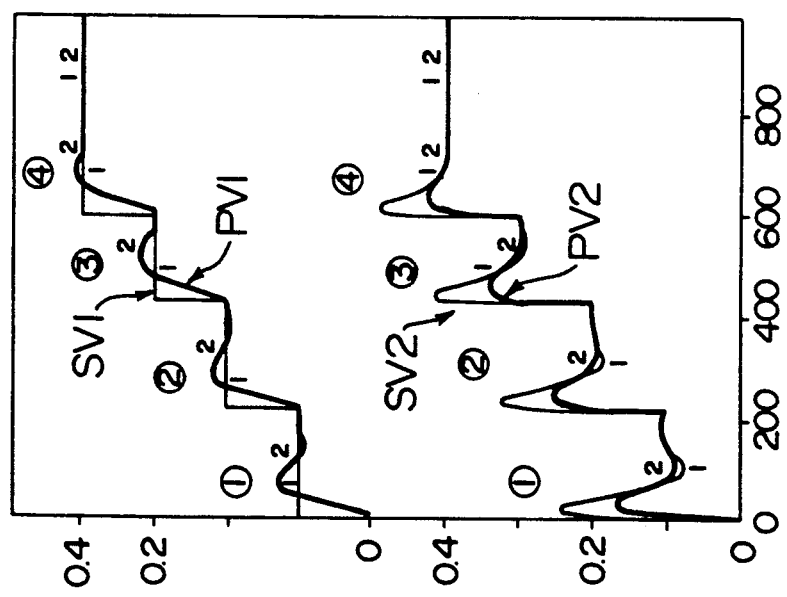

SELF-TUNING CONTROLLER APPARATUS AND PROCESS CONTROL SYSTEM

This application is a continuation of application Ser. No. 07/409,140, filed on Sep. 19, 1989, now abandoned.

BACKGROUND OF THE INVENTION

The present invention relates to feedback controller apparatus and process control systems, and more particularly relates to a controller apparatus capable of self-tuning control parameters such as proportional-integral-derivative (PID) control parameters and a process control system using a plurality of such self-tuning controller apparatus.

Conventionally, an operator has manually perform the tuning of PID control parameters in a PID controller while observing variations in a controlled variable. In the point of view of the control theory, on the other hand, there have been numbers of proposals as to a system in which an identifying test signal is applied to a process (or controlled object, controlled system or the like) to identify the dynamic characteristics of the process so that a control parameter is tuned to an optimum value on the basis of the result of identification.

Further, as a heuristic method (expert method) in which a control parameter tuning is performed while observing a controlled variable response pattern or shape, known is a method disclosed in JP-A-62-108306. According to this method, an actual response pattern is compared with a plurality of reference response patterns to find a reference response pattern which matches the actual response pattern and an optimum rule is selected among a plurality of adjustment rules corresponding to the matched reference response pattern in accordance with the actual response pattern or the transient tendency of the actual response pattern to thereby correct PID control parameters. As the method of this kind, further known is that disclosed in U.S. Pat. No. 4,602,326. Further, U.S. Pat. No. 4,903,192 filed Apr. 1, 1988 relates to a PID controller system.

SUMMARY OF THE INVENTION

Of those aforementioned conventional techniques, in the case where PID control parameter tuning is manually performed, there has been a problem that a long time is required for adjustment work. In particular, in a process control system configured such that a plurality of PID control elements (controllers) are horizontally and vertically distributed, control loops partially or mutually interfere so that much labor and time have been required for the work for tuning the control parameter. There has been a further problem that the results of tuning are different from operator to operator.

In the case where tuning is performed by use of an identifying test signal, there occurs a problem that the controlled variable fluctuates by the application of the identifying test signal to thereby cause lowering of the quality or cause an abnormal state particularly in a plant of high non-linearity. There has been a further problem of a poor handlability that it is impossible to obtain an optimum value of a control parameter unless an identification test is carried out every time a change occurs in dynamic characteristics in the process.

In the aforementioned expert methods, particularly in the case where PID control elements are vertically distributed for example in a cascade controller, there has been a problem that since the system is configured such that the output of an upper rank PID control element is included in a set-point of a lower rank PID control element, it is necessary to change over the operation mode of the upper rank PID control element into manual operation when tuning is made in the lower rank PID control element so that a long time and a labor of an operator are required for the tuning operation. There has been a further problem that the adjustment rules become large in number and the memory becomes large in capacity.

It is therefore an object of the present invention to solve the foregoing problems in the prior art.

It is another object of the present invention to provide a controller apparatus having a self-tuning facility, such as a self-tuning PID controller, in which a control parameter is automatically optimized without requiring manual operation by an operator and without applying any identifying test signal to a process.

It is a further object of the present invention to provide a process control system having a self-tuning function for parallelly optimizing control parameters of a plurality of vertically distributed control elements (controllers) without requiring manual operation by an operator and without applying any identifying test signal to a process.

In order to attain the above objects, according to an aspect of the present invention, a controller apparatus for PID- or PI-controlling a process, comprises: a control response pattern (or shape) recognition means for receiving a set-point and a controlled variable for the process and for obtaining a plurality of a control performance indexes from controlled variable response pattern generated upon occurrence of a change in the set-point or upon application of a disturbance; a control parameter correction means for qualitatively evaluating the plurality of control performance indexes and for inferring a correction value of a control parameter on the basis of the result of evaluation; and a satisfaction/dissatisfaction degree evaluation means for evaluating satisfaction or dissatisfaction degrees for target control specifications of at least two of the plurality of performance indexes and for correcting the inferred correction value of the control parameter in accordance with the evaluated satisfaction or dissatisfaction degrees. The control performance indexes are features for evaluating the control performance and hereinafter simply called as performance indexes.

Preferably, the controller apparatus is additionally provided with a control performance judgment means for actuating the parameter correction means, the satisfaction/dissatisfaction degree evaluation means, and the parameter adjustment value operation means in the case where the above-mentioned at least two performance indexes do not satisfy the target control specifications.

The control response pattern recognition means starts the observation of the controlled variable response pattern when the control deviation exceeds a predetermined value. Thus, a change in dynamic characteristics of the process can be detected immediately. In order to make it possible to perform control parameter tuning in a manner similar to the thinking pattern of a skilled operator, the control pattern correction means employs inference such as fuzzy inference or the like and qualitatively evaluates performance indexes such as an overshoot quantity of the controlled variable response pattern, an amplitude damping ratio (hereinafter simply called as damping), an oscillation period ratio (hereinafter simply called as period ratio) which is a ratio between preceding and current values of the oscillation period, and so on to thereby tune the control parameters to optimum values. Thus, the optimum tuning of the control parameters can be realized as if it is achieved by a skilled operator. The satisfaction/dissatisfaction degree means evaluates the degree of satisfaction or dissatisfaction of current control performance for its target control specification so as to give a weight to the result of fuzzy inference in accordance with the evaluated degree. Thus, the control parameters can be made to converge stably. Further, the control performance judgment means actuates the control parameter correction means repeatedly until the overshoot quantity and the damping satisfy their target control specifications. Thus, the control performance can be maintained in an optimum state.

According to another aspect of the present invention, a process control system has a self-tuning function for optimizing control parameters of a plurality of vertically distributed control elements, the self-tuning function being realized by a self-tuning means provided in each of the control elements, the self-tuning means comprising: means for estimating, through inference, a correction coefficient of the control parameters on the basis of a predetermined adjustment rule from performance indexes obtained from a controlled variable response pattern generated in response to a change of the set-point or a disturbance; and means for judging satisfaction or dissatisfaction degrees for the target values of the performance indexes and for correcting the correction coefficient in accordance with the satisfaction or dissatisfaction degrees. The essence of the present invention exists in a satisfaction/dissatisfaction degree means. Even if a control element having a self-tuning function is provided in each of a plurality of vertically distributed processes, stable process control can not be expected if the tuning results of the respective control elements interfere with each other. When, as a result of control parameter tuning by the self-tuning means to which the satisfaction/dissatisfaction degree means belongs, the control performance approaches the target value, each satisfaction/dissatisfaction degree means suppresses the correction of the control parameter, to thereby prevent the mutual interference among the tuning results by the respective control elements. By use of such a satisfaction/dissatisfaction degree means, for example, in the case where the control of a minor loop is insufficient while a main loop is well controlled, it is possible to maintain the main loop so as not to be affected by the change in the control of the minor loop even if the control of the minor loop changes largely.

Preferably, the first self-tuning means included in the first control element which does not have the outputs of the other control elements as the inputs thereto, is provided with: a control response pattern recognition means for observing the controlled variable response pattern upon occurrence of a change in the set-point or upon application of a disturbance to thereby obtain, as the performance indexes, an overshoot quantity, a damping and a period ratio which is a ratio of preceding and current values of the oscillation period indicated by the control response pattern; a control parameter correction coefficient inference means for qualitatively evaluating those performance indexes to thereby infer a correction coefficient of the control parameter through fuzzy inference on the basis of an adjustment rule; a satisfaction/dissatisfaction degree evaluation means for obtaining a weight coefficient in accordance with the degree of satisfaction o dissatisfaction for the target control performance specifications through fuzzy inference on the basis of a predetermined evaluation rule from the above-mentioned overshoot quantity and damping; a control parameter adjustment value operation means for obtaining an adjustment value of the control parameter by adding a current value of the control parameter to a product among the control parameter correction coefficient, the weight coefficient, and the current value of the control parameter; and a control performance judgment means for actuating the control parameter correction coefficient estimation means, the satisfaction/dissatisfaction degree evaluation means, and the control parameter adjustment value operation means when the above-mentioned overshoot quantity and damping do not satisfy the target specifications thereof.

Preferably, the second self-tuning means included in the second control element which has the outputs of the other control elements in its own set-point, is provided with: a control response pattern recognition means for observing the controlled variable response pattern upon occurrence of a change in the set-point or upon application of a disturbance to thereby obtain, as the performance indexes, a control area damping ratio based on the time quadrature value of an absolute value of a control deviation and settling time ratio which is a ratio between preceding and current values of the settling time of the controlled variable response; a control parameter correction coefficient inference means for qualitatively evaluating those performance indexes to thereby estimate a correction coefficient of the control parameter through fuzzy inference on the basis of an adjustment rule; a satisfaction/dissatisfaction degree evaluation means for obtaining a weight coefficient in accordance with the degree of satisfaction or dissatisfaction for the target control performance specification through fuzzy inference on the basis of a predetermined evaluation rule from the above-mentioned control area damping ratio; a control parameter adjustment value operation means for obtaining adjustment values of the control parameters by adding current values of the control parameters to a product among the control parameter correction coefficients, the weight coefficient, and the current value of the control parameters; and a control performance judgment means for actuating the control parameter correction coefficient estimation means, the satisfaction/dissatisfaction degree evaluation means, and the control parameter adjustment value operation means when the above-mentioned control area damping ratio does not satisfy the target specification thereof.

In each of the first and second self-tuning means, the control response pattern recognition means starts the observation of the controlled variable response pattern when the control deviation exceeds a predetermined value. Thus, each control element can autonomously detect a change in dynamic characteristics of the process immediately. In order to make it possible to perform control parameter tuning in a manner similar to the thinking pattern of a skilled operator, the control pattern correction means employs fuzzy inference. In the first self-tuning means, since a step-like or ramp-like set-point is given independently, used is such a method of inferring an optimum value of the control parameter by qualitatively evaluating the overshoot quantity, the damping and the period ratio which is a ratio of preceding and current values of the oscillation period indicated by the control response pattern. In the second self-tuning means, on the other hand, since a set-point depending on the output of the other control element is given, employed is a method of inferring an optimum value of the control parameters by qualitatively evaluating the control area damping ratio obtained from the time quadrature value of a control deviation and the settling time ratio which is a ratio between preceding and current values of the settling time of the controlled variable response. Thus, the optimum tuning of the control parameter can be realized as if it is achieved by a skilled operator. The satisfaction/dissatisfaction degree means evaluates the degree of satisfaction or dissatisfaction of current control performance for its target control specification so as to correct the result of fuzzy inference in accordance with the evaluated degree. Thus, the control parameter can be made to converge stably. Further, by means of the control performance judgment means, the control performance ca be maintained in an optimum state.

BRIEF DESCRIPTION OF THE DRAWINGS

FIGS. 4 to 6 are diagrams showing membership functions for evaluating an overshoot quantity, a damping, and for evaluating a period ratio;

FIG. 7 is a diagram showing an example of adjustment rules;

FIG. 8 is a diagram showing membership functions for a control parameter correction coefficient;

FIG. 11 is a diagram for explaining the processing in the control parameter adjustment value operation portion;

FIG. 13 is a diagram showing an example of results by self-tuning in this embodiment;

FIG. 15 is a schematic flowchart for explaining the processing in the self-tuning controller of FIG. 14;

FIG. 20A and 20B are graphs showing membership functions for evaluating a control area damping ratio and membership functions for evaluating a settling time ratio respectively;

FIG. 21 is a diagram showing an example of adjustment rules;

FIG. 22 is a graph showing membership functions for a control parameter correction coefficient;

FIGS. 25A through 25C are diagrams showing results of self-tuning of control parameters in the cascade controller in the embodiment of FIG. 16;

DESCRIPTION OF THE PREFERRED EMBODIMENTS

An embodiment of the PID controller to which the present invention is applied will be described hereunder with reference to the accompanying drawings.

Figure 1:
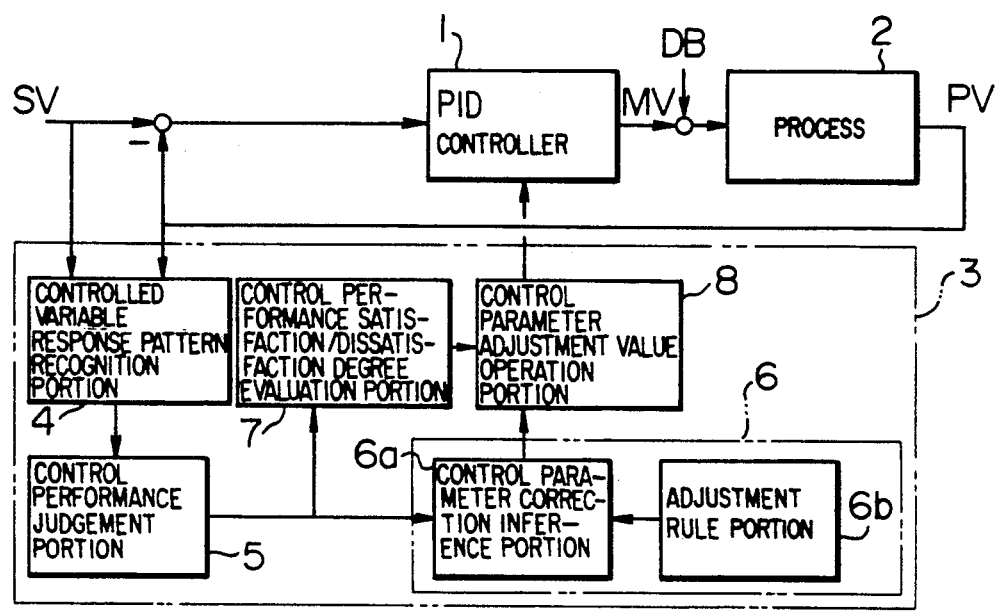
FIG. 1 is a block diagram showing the configuration of an embodiment of the self-tuning PID controller according to the present invention.

FIG. 1 is a block diagram showing an embodiment of the controller apparatus for making self-tuning of control parameters according to the present invention. In the figure, a PID controller (PID control element) 1 performs PID operation on a control deviation obtained by comparing a set-point SV with a controlled variable PV with each other, and applies the results of operation to a process 2 as a manipulated variable MV. A self-tuning portion 3 of the PID controller 1 is constituted by a controlled variable response pattern recognition portion 4, a control performance judgment portion 5, a control parameter correction portion 6, a control performance dissatisfaction degree evaluation portion (or satisfaction/dissatisfaction degree evaluation portion) 7, and a control parameter adjustment value operation portion 8. The control parameter correction portion 6 is constituted by a control parameter correction coefficient inference portion 6a and an adjustment rule portion 6b.

Figure 2:
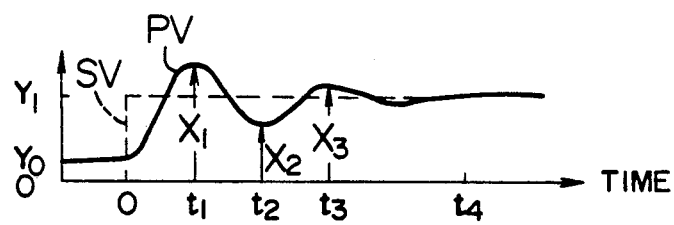
FIG. 2 is a diagram useful for explaining a method of obtaining performance indexes from a controlled variable response pattern and showing an example of a controlled variable response pattern when a set-point is changed stepwise.
Figure 3:
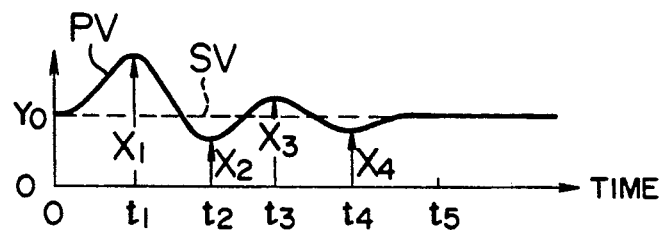
FIG. 3 is a diagram showing an example of a controlled variable response pattern when a disturbance is applied stepwise.

Next, the aforementioned various portions will be described. The controlled variable response pattern recognition portion 4 always observes the set-point SV and the controlled variable PV, and starts to observe a controlled variable response pattern at a point of time a control deviation has exceeded a predetermined value after settling of the controlled variable PV to the set-point SV. The controlled variable response pattern recognition portion 4 searches peaks of the controlled variable PV simultaneously with the start of observation, terminates the observation at a point of time the controlled variable PV has been settled to the set-point SV, and obtains an overshoot quantity, a damping, a period ratio from the obtained peaks and the time of occurrence of the peaks. Referring to FIGS. 2 and 3, description will be made as to a method of obtaining those values. FIG. 2 is a diagram showing an example of time response of the controlled variable PV when the set-point SV has changed stepwise from $Y_0$ to $Y_1$ at time 0, FIG. 2 shows the case where peaks $X_1$, $X_2$, and $X_3$ appear at time $t_1$, $t_2$, and $t_3$ respectively and the controlled variable PV is settled to the set-point SV at time $t_4$. The overshoot quantity E, damping D, and oscillation period T is this case can be obtained through the following expressions.

$$E = (X_1 - Y_1)/(Y_1 - Y_0)$$

$$D = (X_1 - X_2)/(X_3 - X_2)$$

$$T = t_3 - t_1$$

Therefore, let a preceding value of the period T be $T_1$, then the period ratio R can be obtained through the following expression.

$$R = T_1/T$$

FIG. 3 is a diagram showing an example of time response of the controlled variable PV when a disturbance DB is applied stepwise to the input terminal of the process 2 under the condition that the set-point SV is $Y_0$. FIG. 3 shows the case where peaks $X_1$, $X_2$, $X_3$ and $X_4$ appear at time $t_1$, $t_2$, $t_3$, and $t_4$ respectively and the controlled variable PV is settled to the set-point SV at time $t_5$. The overshoot quantity E, damping D, and oscillation period T in this case can be obtained through the following expressions.

$$E = (Y_0 - X_2)/(X_1 - Y_0)$$

$$D = (X_3 - X_4)/(X_3 - X_2)$$

$$T = t_4 - t_2$$

If no peaks appear in the controlled variable response pattern when the set-point SV is changed or if no second peak appears in the controlled variable response pattern when a disturbance is applied, the overshoot quantity is set to a negative value, and the period is set to zero. If only one peak appears in the controlled variable response pattern when the set-point SV is changed or if only two peaks appear in the controlled variable response pattern when a disturbance is applied, the time difference $(t_4 - t_1)$ or $(t_5 - t_2)$ between the settling time $t_4$ and the first peak generation time $t_1$ or between the settling time $t_5$ and the second peak generation time $t_2$ is used as the period, respectively.

If the obtained overshoot quantity and damping satisfy corresponding target control specifications, the control performance judgment portion 5 judges that the control parameter is in the optimum value, and terminates the tuning. The target control specifications have certain ranges. For example, they are 3 to 7% and 0 to 0.3 for the overshoot quantity and the damping, respectively. If either one of the overshoot quantity and the damping does not satisfy the target control specification, the control performance judgment portion 5 causes the control parameter correction portion 6 and the control performance satisfaction/dissatisfaction degree evaluation portion 7 to operate.

Next, description will be made as to the control parameter correction coefficient inference portion 6a using fuzzy inference. In order to qualitatively evaluate the values of the overshoot quantity, damping, and period ratio, membership functions (performance-index evaluation means) as shown in FIGS. 4 to 6 will be defined. In the figure, E(i) (i = 1, 2, ..., 5), D(i) (i = 1, ..., 3), and R(i) (i = 1, ..., 3) represent constants for defining the membership functions, and PB, PM, ZE, and NB represent names given to the membership functions so as to qualitatively evaluate the magnitudes of the membership functions, PB, PM, ZE, and NB having the following meaning.

PB: Positive Big (big)
PM: Positive Medium (medium)
ZE: Zero (proper)
NB: Negative Big (small)

Further, the ordinate in each drawing represents a membership value representing a qualitative degree. FIG. 7 shows an example of the adjustment rule 6b for P, I and D control parameters with respect to various controlled variable response patterns formed by using the membership functions.

In the figure, for example, a rule 2 has a meaning that,
if (E is PB, D is PM, and R is PB), then,
(CP1 is NB, CI1 is NB, and CD1 is ZE).

The preceding portion is called a conditional portion, and the succeeding is called a conclusive portion. In the conditional Portion, E, D and R represent an overshoot quantity, a damping and a period ratio. In the conclusive portion, CP1, CI1, and CD1 represent correction coefficients for the proportional gain, integral time and derivative time respectively.

FIG. 8 shows membership functions for converting a qualitatively determined control parameter correction coefficient into a quantitative value. In the figure, C(i) (i = 1, 2, ..., 4) represent constants for prescribing the shape of the membership functions. PB, ZE, and NB represent names given to the membership functions so as to qualitatively represent the values of the control parameter correction coefficients, and the names correspond to those used in FIG. 3. The ordinate in the figure represents a membership value.

Figure 9:
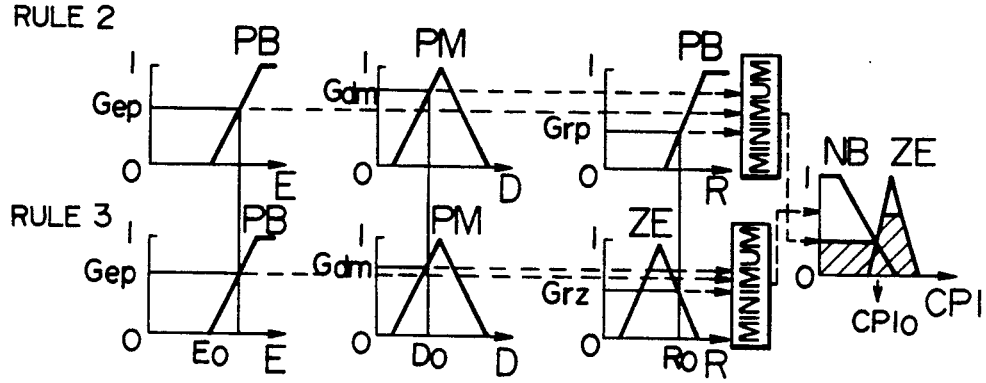
FIG. 9 is a diagram for explaining a method of obtaining the control parameter correction coefficient through fuzzy inference.

Next, the way how to obtain the control parameter correction coefficients will be described, by way example, as to the case where only the rules 2 and 3 are applied. FIG. 9 shows the method of determining the proportional gain correction coefficient CP1 by using fuzzy inference. First, the qualitative degrees of the overshoot quantity $E_0$, damping $D_0$, and period ratio $R_0$ obtained in the controlled variable response pattern recognition portion 4 are obtained by using the membership functions of FIGS. 4 to 6. In the rule 2, the degrees that $E_0$, $D_0$ and $R_0$ become PB, PM and PB are Gep, Gdm, and Grp, respectively. In the rule 3, on the other hand, the degrees that $E_0$, $D_0$ and $R_0$ become PB, PM and ZE are Gep, Gdm, and Grz, respectively. Product set operation (that is, minimum value operation) is performed for every rule so as to obtain the adaptation of each rule. Grp is obtained as the adaptation in the rule 2 because the minimum value is Grp, while Grz is obtained as the adaptation in the rule 3 because the minimum value is Grz. Next, the membership functions of the conclusive portions of the respective rules are weighted with the adaptation of the rules, and then sum set operation (that is, maximum value operation) is performed on the thus obtained weighted values, so that the value of the center of gravity of the thus obtained sum set is made to be the proportional gain correction coefficient $CP1_0$. The integral time correction coefficient CI1 and the derivative time correction coefficient CP1 are obtained in the same manner as in the case of the proportional gain correction coefficient CP1.

Figure 10A:
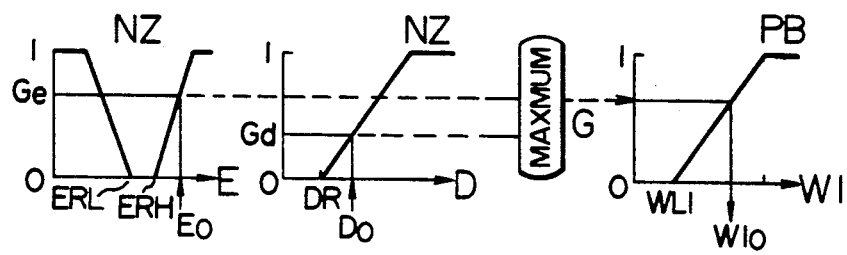
FIGS. 10A and 10B are diagrams for explaining the processing in the control performance satisfaction/dissatisfaction degree evaluation portion.
Figure 10B:
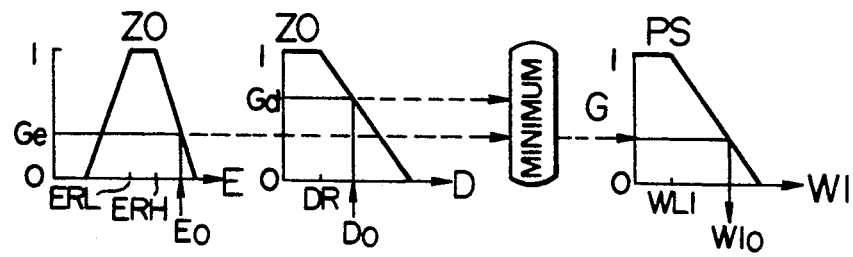

Next, referring to FIGS. 10A and 10B, the control performance satisfaction/dissatisfaction degree evaluation portion 7 will be described.

Here, a weight coefficient $W_1$ is obtained by using fuzzy inference on the basis of the evaluation rule from the overshoot quantity E and damping D obtained in the process controlled variable response pattern recognition portion 4. As shown in FIG. 10A, the membership function named NZ (dissatisfaction) is defined in order to qualitatively evaluate the dissatisfaction degree of the overshoot quantity E and damping D relative to the respective target control specifications, and the membership function named PB (big) is defined in order to qualitatively grasp the magnitude of the weight coefficient. Further, for example, the following evaluation rule is provided.

If (E is NZ or D is NZ) then W1 is PB. That is, this evaluation rule means that if E or D is NZ (dissatisfaction), W1 is made to be PB (big). FIG. 10A shows the method of determining the weight coefficient by using fuzzy inference. The dissatisfaction degrees Ge and Gd of the respective performance indexes $E_0$ and $D_0$ obtained in the controlled variable response pattern recognition portion 4 are obtained from the membership functions NZ for the performance indexes $E_0$ and $D_0$, and the weight coefficient $W1_0$ is obtained from the membership function PB as a value weighted with the maximum value Ge of the dissatisfaction degrees. Therefore, the smaller the dissatisfaction degrees of the performance indexes become, the smaller the weight coefficient becomes. In the figure, ERL and ERH represent lower and upper limit values of the target control specification of the overshoot quantity E respectively, and DR represents an upper limit value (the lower limit value being zero) of the target control specification of the damping D. The ordinates of the functions NZ and PB represent membership values respectively representing the degree of dissatisfaction and the degree of bigness. Further, WL1 represents a lower limit value of the weight coefficient W1 provided for preventing the convergence of the control parameter from becoming slow. Although the weight coefficient W1 is generally treated in this case, the weight coefficient W1 ma be provided individually for each of the control parameter correction coefficients CP1, CI1, and CD1. Alternatively, the weight coefficient W1 may be obtained from the satisfaction degrees of the overshoot quantity and damping relative to the target control specifications. That is, if ZO (satisfaction) and PS (small) are defined as complementary sets of the foregoing NZ (dissatisfaction) and the PB (big), the foregoing evaluation rule is equivalent to the following one.

If (E is ZO and D is ZO) then W1 is PS. This evaluation rule means that if all E and D are ZO (satisfaction), W1 is made to be PS (small). FIG. 10B shows the method of determining the weight coefficient by using fuzzy inference. The satisfaction degrees Ge and Gd of the performance indexes $E_0$ and $D_0$ obtained in the controlled variable response pattern recognition portion 4 are obtained from the membership functions ZO for the performance indexes $E_0$ and $D_0$, and a weight coefficient $W1_0$ is obtained from the membership function PS as a value weighted by the maximum value Ge of the satisfaction degrees. Therefore, the larger the satisfaction degrees of the performance indexes become, the smaller the weight coefficient becomes. Further, the ordinates of the functions ZO and PS in the figure represent membership values respectively representing the degree of satisfaction and the degree of smallness.

FIG. 11 shows the function of the control parameter adjustment value operation portion 8.

The control parameter adjustment value operation portion 8 adds current values $Kp_{N-1}$, $Ti_{N-1}$, and $Td_{N-1}$ of the PID control parameters to the control parameter correction values $\Delta Kp$, $\Delta Ti$, and $\Delta Td$ obtained through multiplication among the weight coefficient W1 obtained in the control performance satisfaction/ dissatisfaction degree evaluation portion 7, the control parameter correction coefficients CP1, CI1 and CD1 obtained in the control parameter correction portion 6, and the control parameter current values $Kp_{N-1}$, $Ti_{N-1}$ and $Td_{N-1}$, thereby determining current adjustment values $Kp_N$, $Ti_N$, and $Td_N$.

Figure 12:
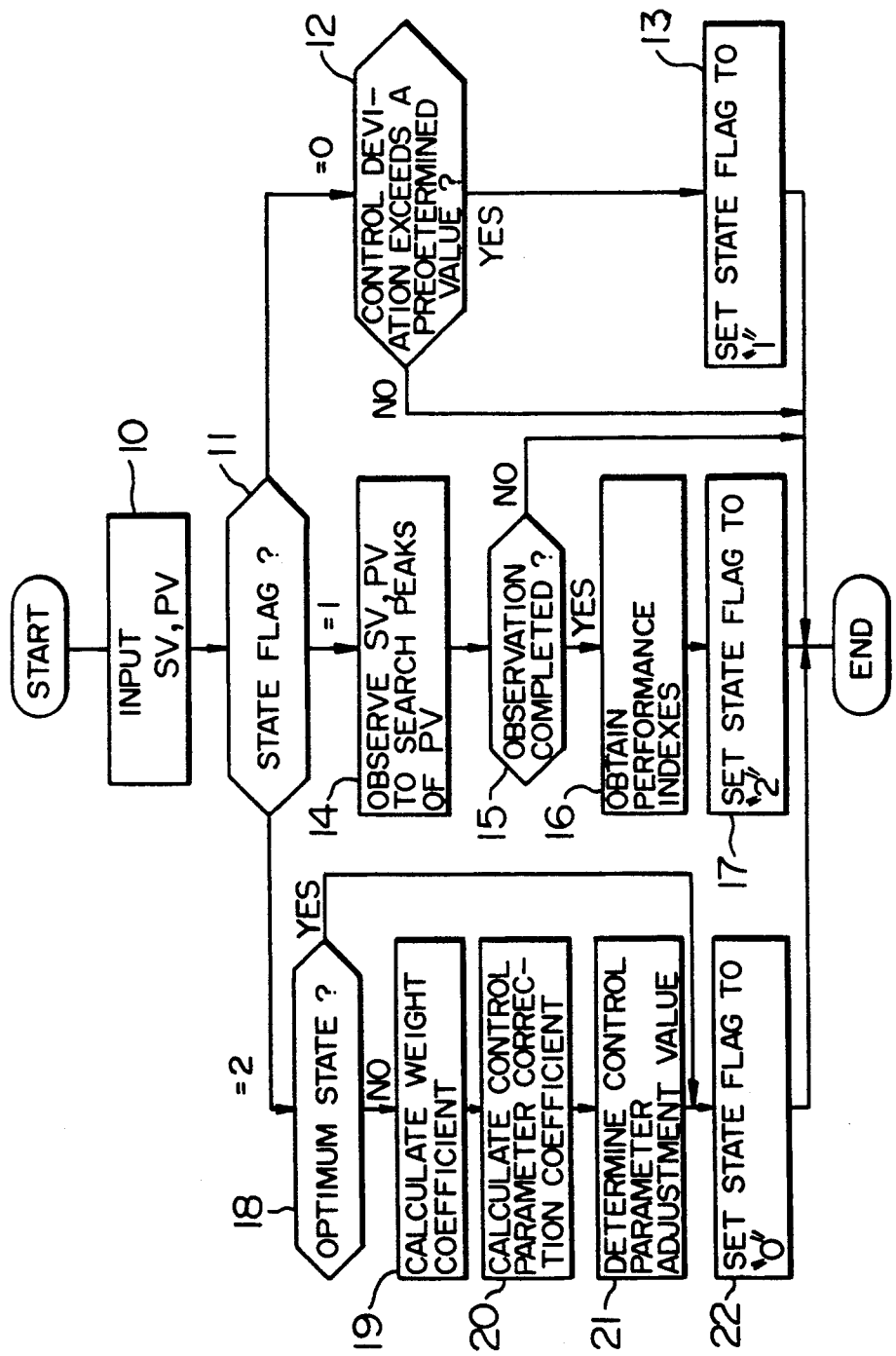
FIG. 12 is a schematic flowchart for explaining the processing in the self-tuning controller of this embodiment.

FIG. 12 is a schematic flowchart for explaining the processing in the self-tuning portion 3. SV and PV are inputted at fixed time intervals at block 10, and judgment is made, in block 11, on the state flag indicating the processing state of the self-tuning portion 3 every time SV and PV are inputted. The state flag of "0" means the control response monitoring state, the state flag of "1" means the control response observing and evaluating state, and the state flag is "2" means the control parameter calculating state. If the judgment proves that the state flag is "0", judgment is made as to whether the control deviation exceeds a predetermined value or not at block 12. If the judgment proves that the control deviation exceeds the predetermined value, the state flag is set to "1" at block 13, and the operation is shifted to the control response observing state. If the judgment proves that the control deviation does not exceed the predetermined value, the control response monitoring state is maintained. If the judgment proves that the state flag is "1" at block 11, the peaks of PV are searched at block 14. The processing is continued before PV is settled to SV (completion of observation) at block 15. Upon completion of observation, performance indexes (an overshoot quantity, a damping, a period ratio, etc.) are obtained at block 16 by using results of the peak search obtained at block 14, the state flag is set to "2" at block 17, and the operation is shifted to the control parameter calculating state. The processing flowchart up to here corresponds to the controlled variable response pattern recognition portion 4.

Next, if the judgment proves that the state flag is "2" at block 11, judgment is made as to whether or not the performance indexes obtained at block 16 satisfy the respective target control specifications to thereby judge whether or not the observed control response is in the optimum state at block 18. This processing corresponds to that of the control performance judgment portion 5. Only when the observed control response does not reach the optimum state, a weight coefficient, a control parameter correction coefficient, and a control parameter adjustment coefficient are sequentially obtained at blocks 19, 20, and 21. The thus obtained control parameter adjustment values are used for control operation in the PID controller 1. Block 19 corresponds to the processing of the control performance satisfaction/dissatisfaction degree evaluation portion 7, block 20 corresponds to the processing of the control parameter correction coefficient inference portion 6a and the adjustment rule portion 6b, and block 21 corresponds to the processing of the control parameter adjustment value operation portion 8. In the case where the judgment proves that the observed control response is in the optimum state at block 18 and when the processing at block 21 is completed, the state flag is reset to "0" at block 22, and the operation is returned to the control response monitoring state.

FIG. 13 is a diagram showing the case where the PID controller according to the present invention is applied to a controlled system having second-order lag and dead time characteristics. FIG. 13 shows the time response of the controlled variable PV when the set-point SV is changed. In the figure, (a) shows the results of self-tuning in the case of using the PID controller according to the present invention, and (b) shows the results of self-tuning in the case where the control performance satisfaction/dissatisfaction degree evaluation portion 7 is not used. In the case of (a), it is found that the overshoot quantity and the damping stably reach the respective target control specifications (the overshoot quantity: 3-7% and the damping: 0-0.5) through three trials. In the case of (b), on the other hand, it is found that the control parameter is excessively corrected on the second trial and therefore an oscillatory tuning process appears in the trials thereafter.

As described above, according to the present invention, there is such an effect that self-tuning of control parameters can be made by few adjustment rules and the convergence of the control parameters in repeat trials can be stably performed.

Figure 14:
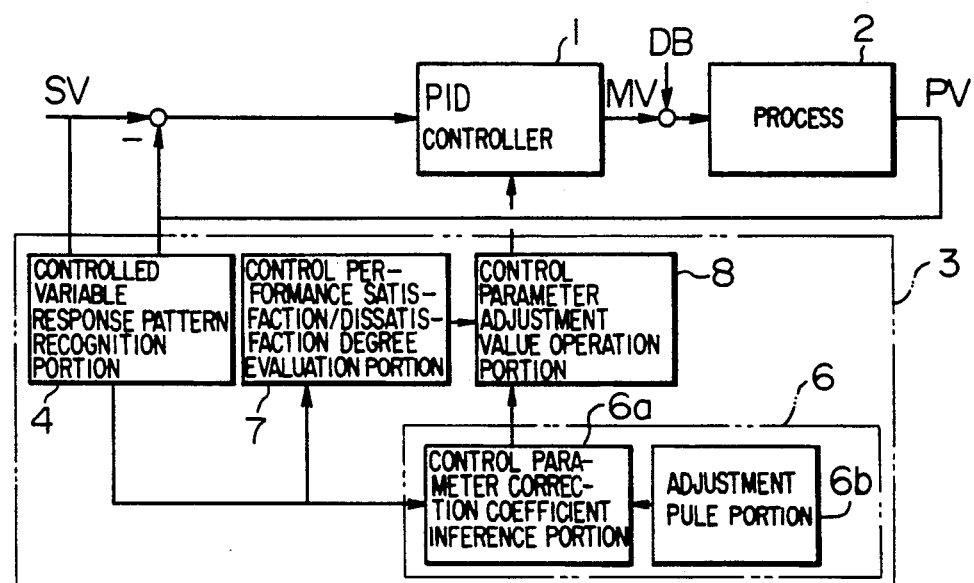
FIG. 14 is a block diagram showing the configuration of another embodiment of the self-tuning PID controller according to the present invention.

FIG. 14 is a diagram showing another embodiment of the self-tuning PID controller according to the present invention. FIG. 15 is a flowchart for explaining the schematic processing in the self-tuning portion of the self-tuning PID controller. In FIGS. 14 and 15, portions the same as or corresponding to those of the embodiment of FIGS. 1 and 12 are referenced correspondingly. The embodiment of FIG. 14 is different from that of FIG. 1 in that the control performance judgment portion 5 is omitted so that the control parameter correction portion 6, the control performance satisfaction/dissatisfaction degree evaluation portion 7, and the control parameter adjustment value operation portion 8 are energized even when the performance indexes obtained in the controlled variable response pattern recognition portion 4 satisfy the target control specifications thereof. Therefore, the processing flowchart of FIG. 15 is quite the same as that of FIG. 12 except that block 18 of FIG. 12 is omitted in the flowchart of FIG. 15, the explanation of the flowchart of FIG. 15 being therefore omitted. in this embodiment, although it is possible to obtain the same effect as that of the foregoing embodiment, there is a disadvantage in that the load factor of the microcomputer is high in comparison with the foregoing embodiment because all the portions are energized even when the control performance satisfies the target control specification.

In the foregoing embodiments, the ratio between preceding and current values of the rise time of the controlled variable (for example, the time for the first peak generation when the set-point is changed) or of the settling time of the controlled variable may be used as a third performance index in the controlled variable response pattern recognition portion 4. Further, although the shape of each of the membership functions is selected to be triangle in the control parameter correction portion 6, each membership function is not always limited to this shape, but may be a quadratic curved line or an exponential curved line. Moreover, not only the shape of each membership function but the number of the membership functions may be desirably set. Moreover, although the foregoing embodiments show the case where the controller 1 is a PID controller, the present invention may be applied to any case where the controller 1 is in the form of any other controller, for example a PI controller or the like.

As described above in detail, in the foregoing embodiments of the present invention, there are the following effects.

(1) Since PI control parameters in a PI controller or PID control parameters in a PID controller can be automatically tuned, it is possible to considerably reduce adjustment or tuning work by an operator and to eliminate an individual variation in the results of adjustment.

(2) Since no identifying signal is used, it is possible to tune control parameters in an optimum manner without disturbing the process.

(3) Since a change in dynamic characteristics of the controlled system can be rapidly detected without requiring hands, it is possible to maintain the optimum control characteristics.

Next, description will be made hereunder as to a further embodiment in which the self-tuning control unit according to the present invention is applied to a cascade controller as an example of the process control system.

Figure 16:
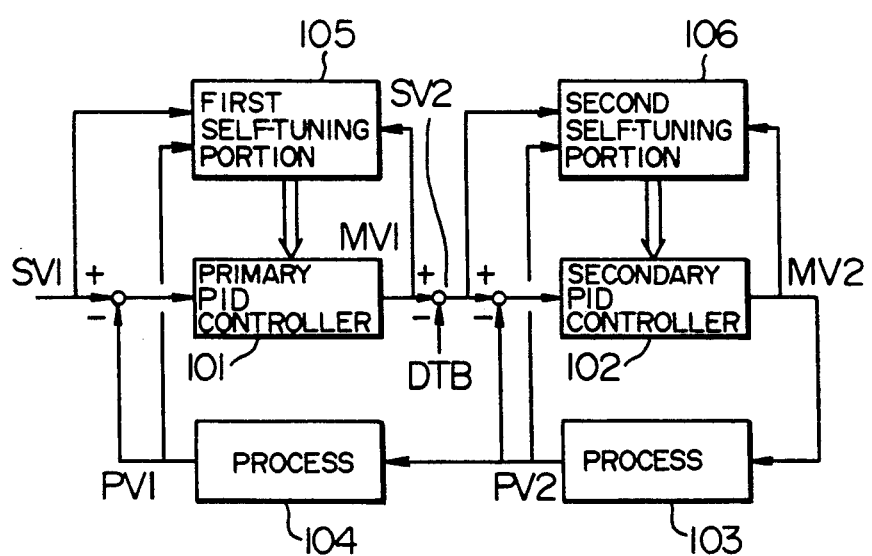
FIG. 16 is a block diagram showing the configuration of a self-tuning cascade controller in an embodiment of the process control system according to the present invention.

FIG. 16 is a diagram showing, in the function block, the configuration of the embodiment of the cascade controller for performing control parameter self-tuning.

A primary PID controller (PID control element) 101 performs PID operation on a control deviation obtained through comparison of a controlled variable PV1 of a process 104 with a set-point SV1 and a disturbance DTB such as a load or the like is added to a manipulated variable MS1 which is the output of the primary PID controller 101 to thereby obtain a secondary set-point SV2. A secondary PID controller (PID control element) 102 performs PID operation on a control deviation e obtained through comparison of a controlled variable PV2 of a process 103 with the secondary set-point SV2, and a manipulated variable MV2 which is the output of the secondary PID controller 102 is applied to the process 103. A first self-tuning portion 105 receives the set-point SV1, the controlled variable PV1, and the manipulated variable MS1, and supplies a control parameter adjustment value to the primary PID controller 101. A second self-tuning portion 106 receives the set-point SV2, the controlled variable PV2, and the manipulated variable MV2, and supplies a control parameter adjustment value to the secondary PID controller 102.

Figure 17:
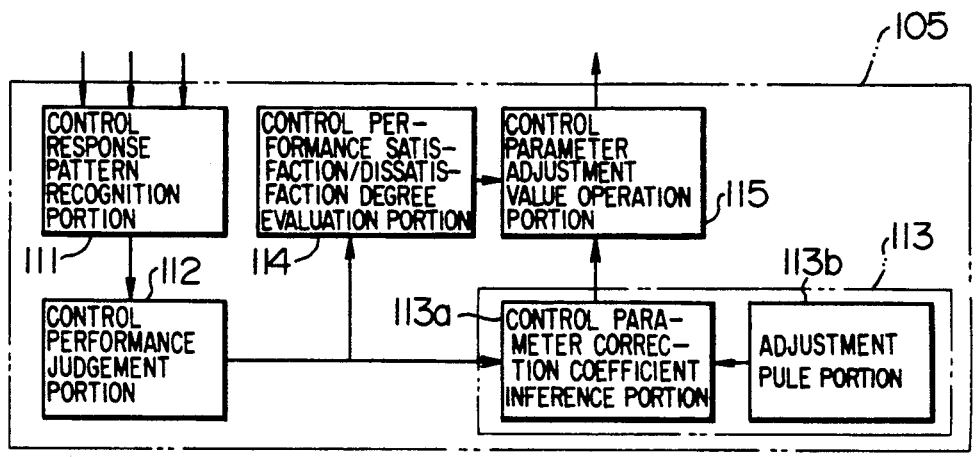
FIG. 17 is a block diagram showing the configuration of the self-tuning portion of the PID controller containing, as a set-point thereof, no outputs from other PID controller.

FIG. 17 shows the functional configuration of the first self-tuning portion 105. The first self-tuning portion 105 is constituted by a control response pattern recognition portion 111, a control performance judgment portion 112, a control parameter correction portion 113, a control performance dissatisfaction degree evaluation portion (satisfaction/dissatisfaction degree evaluation portion) 114, and a control parameter adjustment value operation portion 115. The control parameter correction portion 113 is constituted by a control parameter correction coefficient inference portion 113a and an adjustment rule portion 113b.

Next, the above-mentioned various portions will be described. The control response pattern recognition portion 111 always monitors the set-point SV1 and the controlled variable PV1, and starts to observe the set-point SV1, the controlled variable PV1, and the manipulated variable MV1 at a point of time a control deviation obtained as a difference between the set-point SV1 and the controlled variable PV1 exceeds a predetermined value after the controlled variable PV1 has been settled to the set-point SV1. The control response pattern recognition portion 111 searches peaks of the controlled variable PV1 simultaneously with the start of the observation, and terminates the observation at a point of time the controlled variable PV1 has been settled to the set-point SV1. When the manipulated variable MV1 does not reach a preset limit value of the manipulated variable MV1 in the course of observation, an oveshoot quantity, a damping, and an oscillation period are obtained from the obtained peaks and the generation time of the peaks. Those factors can be obtained by using the same method as that in the case of the controlled variable response pattern recognition portion 4 in the embodiment of FIG. 1. Therefore explanation of the method is omitted.

The control performance judgment portion 112, the control parameter correction portion 113, the control performance satisfaction/dissatisfaction degree evaluation portion 114, and the control parameter adjustment value operation portion 115 have the same functions as those of the control performance judgment portion 5, the control parameter correction portion 6, the control performance satisfaction/dissatisfaction degree evaluation portion 7 and the control parameter adjustment value operation portion 8 in the embodiment of FIG. 1, respectively. Therefore, explanation of those portions is omitted.

Thus, the primary PID controller 101 makes self-tuning of PID control parameters substantially in the same manner as in the embodiment of FIG. 1.

Figure 18:
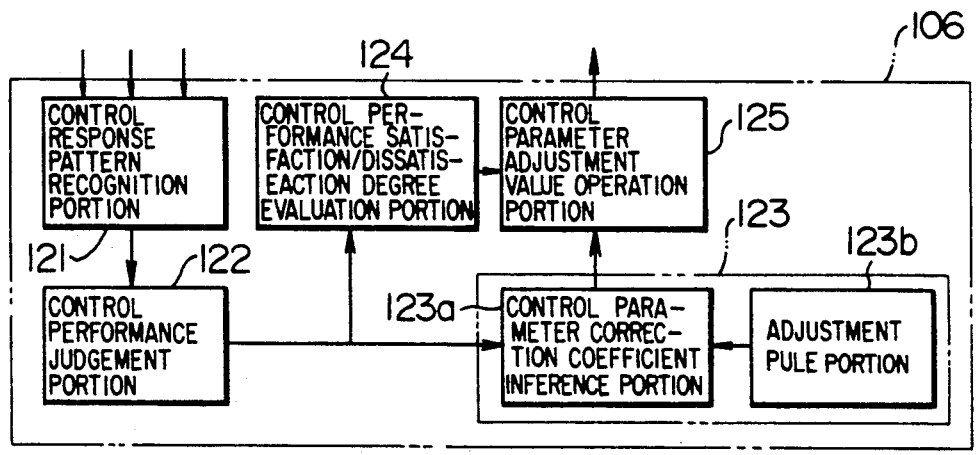
FIG. 18 is a block diagram showing the configuration of the self-tuning portion of the PID controller containing, as a set-point, outputs from other PID controllers.

FIG. 18 shows the configuration of the second self-tuning portion 106. The second self-tuning portion 106 is constituted by a control response pattern recognition portion 121, a control performance judgment portion 122, a control parameter correction portion 123, a control performance dissatisfaction degree evaluation portion (satisfaction/dissatisfaction degree evaluation portion) 124, and a control parameter adjustment value operation portion 125. The control parameter correction portion 123 is constituted by a control parameter correction coefficient inference portion 123a and an adjustment rule portion 123b.

Next, the above-mentioned various portions will be described. The control response pattern recognition portion 121 always monitors the set-point SV2 and the controlled variable PV2, and starts to observe the set-point SV2, the controlled variable PV2, and the manipulated variable MV2 at a point of time the control deviation exceeds a predetermined value after the controlled variable PV2 has been settled to the set-point SV2. The control response pattern recognition portion 121 successively obtains a time quadrature value of the absolute value of the control deviation simultaneously with the start of the observation only for the period where the control deviation having the same polarity is continued, and terminates the observation at a point of time the process controlled variable PV2 has been settled to the set-point SV2.

When the manipulated variable MV2 does not reach a preset limit value of the manipulated variable MV2 in the course of observation, a control area damping ratio is obtained from the successively obtained time quadrature values. The reason why the control area damping ratio is used in this case is that it is difficult to evaluate the control response pattern of the controlled variable PV2 generated in response to the set-point SV2 by using the peaks of the control response pattern since the response wave form remarkably depends on the value of the control parameters of the primary PID controller 101 and takes various shapes and therefore the control performance is evaluated by using the control deviation between the set-point SV2 and the controlled variable PV2. Further, the control area damping ratio is used as the index for evaluating the stability of control, and the settling time ratio, on the other hand, is used as the index for evaluating the speed of control response.

Figure 19:
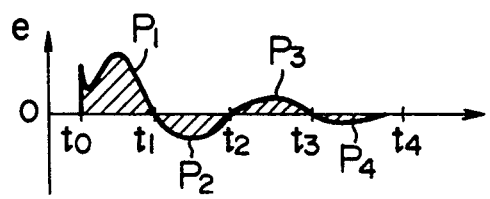
FIG. 19 is a diagram for explaining a method of obtaining performance indexes from a controlled variable response pattern on the basis of a time quadrature value of a control deviation.

Referring to FIG. 19, the method of obtaining the control area damping ratio will be described. FIG. 19 shows an example of time response of the system deviation e which is a difference between the set-point SV2 and the controlled variable PV2. The figure shows the case where observation is started at time 0, the polarity of the control deviation is changed-over at time $t_1$, $t_2$, and $t_3$, and the controlled variable PV2 is settled to the set-point SV2 at time $t_4$. In this case, P1, P2, P3, and P4 are obtained as the time quadrature values of the absolute value of the control deviation, and the control area damping ratio S is obtained through the following expression.

$$S=(P2+P4)/(P1+P3)$$

Further, the settling time is expressed by $t_4$, and the settling time ratio Q is obtained as the ratio between preceding and current values of the settling time.

The control performance judgment portion 122 judges whether the obtained control area damping ratio S satisfies its target specification or not. If the control area damping ratio S does not satisfy the target specification, the control performance judgment portion 122 causes the control parameter correction portion 123 and the control performance satisfaction/dissatisfaction degree evaluation portion 124 to operate.

Next, the control parameter correction coefficient inference portion 123a using fuzzy inference will be described. In order to qualitatively evaluate values of the control area damping ratio S and settling time ratio Q, membership functions as shown in FIGS. 20A and 20B are defined. In the figures, S(i) (i=1, ..., 3) and Q(i) (i=1, ..., 5) are constants for defining the membership functions, and PB, PM, ZE, and NB are names which are given to the membership functions which have the meanings described above. Further, the ordinate in each of the figures represents a membership value representing a qualitative degree. FIG. 21 shows an example of adjustment rule portion 123b for P and I control parameters formed by using the membership functions. For example, in the case of a rule 1, there is a meaning that if (S is PB and Q is PB) then,
(CP2 is NB and CI2 is PB)

Here, CP2 and CI2 represent a proportional gain correction coefficient and an integral time correction coefficient respectively. FIG. 22 shows membership functions for converting the value of the qualitatively determined control parameter correction coefficient into a quantitative value. In the figure, C(i) (i=1, ..., 4) are constants for defining the membership functions, and PB, ZE and NB are names which are given to the membership functions in order to qualitatively represent the value of the control parameter correction coefficient and which correspond to those used in FIG. 8. The ordinate in the figure represents a membership value. In the same manner as described in FIG. 9, the proportional gain correction coefficient CP2 and the integral time correction coefficient CI2 are obtained on the basis of the adjustment rules shown in FIG. 21, by using fuzzy inference, from the control area damping ratio S and settling time ratio Q obtained in the control response pattern recognition portion 121.

Figure 23A:
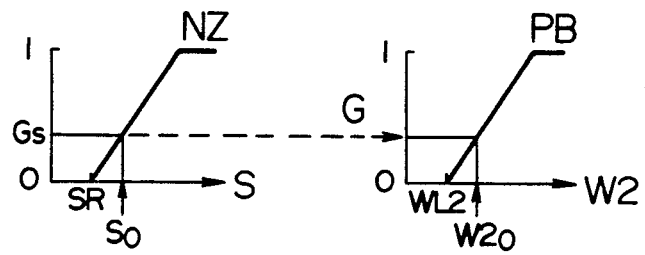
FIGS. 23A and 23B are diagrams for explaining the processing in the control performance satisfaction/dissatisfaction degree evaluation portion using a control area damping ratio.
Figure 23B:
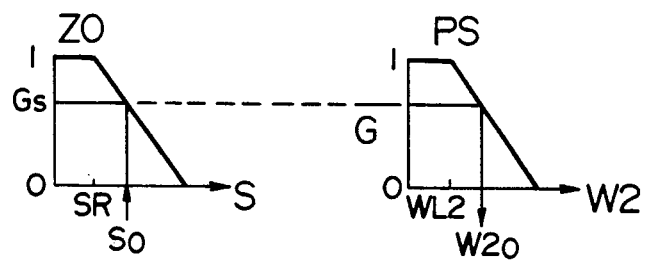

Next, the control performance satisfaction/dissatisfaction degree evaluation portion 124 will be explained with reference to FIGS. 23A and 23B.

A weight coefficient W2 is obtained on the basis of the evaluation rule, by using fuzzy inference, from the control area damping ratio S obtained in the control response pattern recognition portion 121. As shown in FIG 23A, a membership function names NZ (dissatisfaction is defined in order to qualitatively evaluate the dissatisfaction degree of the control area damping ratio S relative to its target control specification, and a membership named PB (big) is defined in order to qualitatively obtain the value of the weight coefficient. Further, for example, the following evaluation rule is provided.

if (S is NZ) then W2 is PB.

That is, the evaluation rule means that if S is NZ (dissatisfaction), W2 is made to be PB (big). FIG. 23A shows the method of determining the weight coefficient by using fuzzy inference. The dissatisfaction degree Gs of the control area damping ratio $S_0$ obtained in the control response pattern recognition portion 121 is obtained from the membership function NZ, and a weight coefficient $W2_0$ is obtained from the membership function PB as a value weighted with the dissatisfaction degree Gs. Therefore, the smaller the dissatisfaction degree of the evaluation index becomes, the smaller the weight coefficient becomes. In the drawing, SR represents an upper limit value (a lower limit value being zero) the target control specification of the control area damping ratio S. Further, WL2 represents a lower limit value of the weight coefficient W2 provided for preventing convergence of the control parameters from becoming slow. The weight coefficient W2, on the other hand, may be obtained from the satisfaction degree of the control area damping ratio S relative to the target control specification. That is, if ZO (satisfaction) and PS (small) are defined as complementary sets of the foregoing NZ (dissatisfaction) and PB (big), the foregoing evaluation rule is equivalent to the following one.

If (S is ZO) then W2 is PS.

The evaluation rule means that is S is ZO (satisfaction), W2 is made to be PS (small). FIG. 23B shows the method of determining the weight coefficient by using fuzzy inference. The satisfaction degree Gs of the evaluation index $S_0$ obtained in the control response pattern recognition portion 121 is obtained from the membership function ZO, and the weight coefficient $W2_0$ is obtained from the membership function PS as a value weighted with the obtained satisfaction degree Gs. Therefore, the larger the satisfaction degree of the evaluation index becomes, the smaller the weight coefficient becomes. The ordinates of the functions ZO and PS in the figure represent membership values respectively representing the degree of satisfaction and the degree of smallness thereof. Further, WL2 represents a lower limit value of the weight coefficient W2 provided for preventing convergence of the control parameters from becoming slow.

The control parameter adjustment value operation portion 125 adds a current value of the control parameter to the correction value of the control parameter obtained through multiplication among the weight coefficient obtained in the control performance satisfaction/dissatisfaction degree evaluation portion 124, the correction coefficient of the control parameter obtained in the control parameter correction portion 123, and the current value of the control parameter, thereby determining the current adjustment value. This method is the same as that described with reference to FIG. 11.

Figure 24:
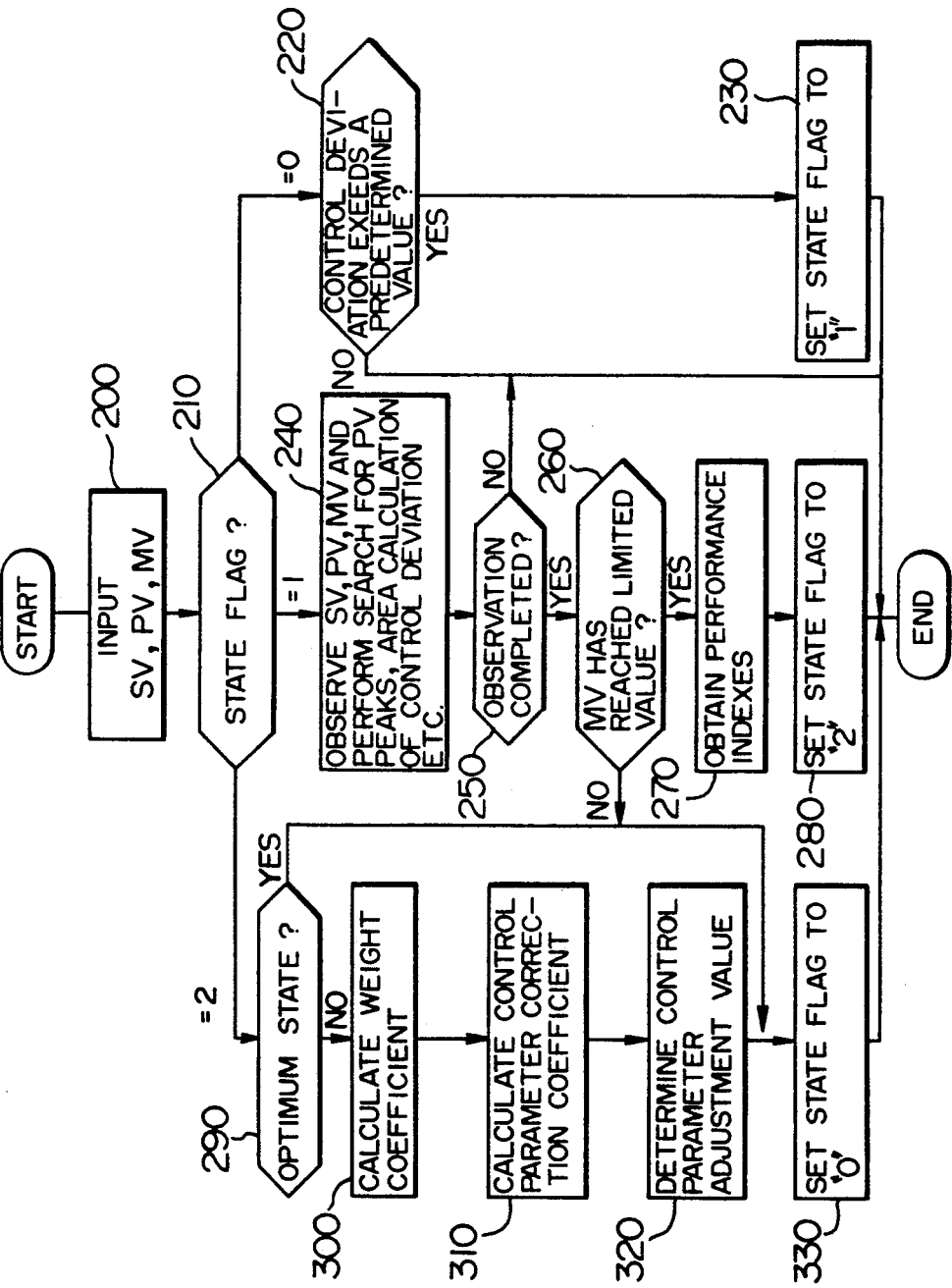
FIG. 24 is a schematic flowchart for explaining the processing by the first and second self-tuning portions in the embodiment of FIG. 16.

FIG. 24 is a schematic flowchart for explaining the processing in the self-tuning portions 105 and 106. SV and PV are inputted at fixed time intervals at block 200, and judgement is made, at block 210, on the state flag indicating the processing state of the self-tuning portions every time SV and PV are inputted. The state flag of "0" means the control response monitoring state, the state flag of "1" means the control response observing and evaluating state, and the state flag is "2" means the control parameter calculating state. If the judgement proves that the state flag is "0", judgement is made as to whether the control deviation exceeds a predetermined value or not at block 220. If the judgement proves that the control deviation exceeds the predetermined value, the state flag is set to "1" at block 230, and the operation is shifted to the control response observing state. If the judgement proves that the control deviation does not exceed the predetermined value, on the other hand, the control response monitoring state is maintained. If the judgement proves that the state flag is "1" at block 210, the processing at block 240 is executed. At block 240, in the case of the first self-tuning portion 105, peak search of the PV and comparison between the MV and a preset limit value thereof are performed, while in the case of the second self-tuning portion 106, time quadrature processing of the absolute value of the control deviation is continued when the polarity of the control deviation is the same as the preceding one, the preceding time quadrature value is stored when the polarity of the control deviation is different from the preceding one, and the MV is compared with a preset limit value thereof.

The processing at block 240 is continued before PV has been settled to SV (completion of observation) at block 250. Upon completion of the observation, judgement is made, on the basis of the results or the step 240, as to whether MV reaches the limit value or not, at block 260. If the judgement proves that MV reaches the limit value, the state flag is reset to "0" at block 330. If the judgement proves that MV does not reach the limit value, on the other hand, the foregoing performance indexes are obtained at block 270, and the state flag is set to "2" at block 280, the operation being then shifted to the control parameter calculation state. The processing flowchart up to this corresponds to the control response pattern recognition portions 111 and 121.

Next, if the judgement proves that the state flag is "2" at block 210, judgment is made as to where or not the performance indexes obtained at block 270 satisfy the respective target control specifications so as to judge whether or not the control response observed at block 290 is in the optimum state. This processing corresponds to the control performance judgement portions 112 and 113. When the observed control response does not reach the optimum state, a weight coefficient, a control parameter correction coefficient, and a control parameter adjustment coefficient are sequentially obtained at blocks 300, 310, and 320 respectively. The thus obtained control parameter adjustment values are used for control operation in the aforementioned PID control element 101 and PI control element 102. The processing at block 300 corresponds to the processing in the control performance satisfaction dissatisfaction degree evaluation portions 114 and 124, the processing at block 310 corresponds to the processing in the control parameter correction coefficient inference portions 113a and 123a and the adjustment rules 113b and 123b, and the processing at block 21 corresponds to the processing of the control parameter adjustment value operation portions 115 and 125. In the case where the judgement proves that the observed control response is in the optimum state at block 290 and when the processing at block 320 is terminated, the state flag is reset to "0" at block 330, and operation is returned to the control response monitoring state through the settled state.

Next, FIGS. 25A through 25C show simulation results in the case where the foregoing cascade controller is applied, as an embodiment of the process control system according to the present invention, to a controlled system having transfer functions $G_1(s)$ and $G_2(s)$ in the processes 104 and 103 represented by the following expressions.

$$G_1(s) = \frac{e^{-5s}}{1 + 30s}, \quad G_2(s) = \frac{e^{-s}}{1 + 3s}.$$

In this case, a PI controller is used as each of the primary and secondary controllers. FIG. 25A shows the time response of the controlled variable PV1, the set-point SV1, and the controlled variable PV2 when the set-point SV1 is repeatedly changed stepwise. FIGS. 25B and 25C show transition processes of primary and secondary PI control parameters respectively. It can be found that the target control specification (the overshoot quantity; 3-7%, the amplitude damping ratio; 0-0.5) has been reached stably through three trials in the primary side, and the target control specification (the control area damping ratio; 0-0.2) has been reached on the second trial in the secondary side.

Thus, in this embodiment, there is such an effect that self-tuning of control parameters of a plurality of PID or PI controllers can be performed parallelly and convergence of the control parameters in the repeat trials can be performed stably.

Figure 26:
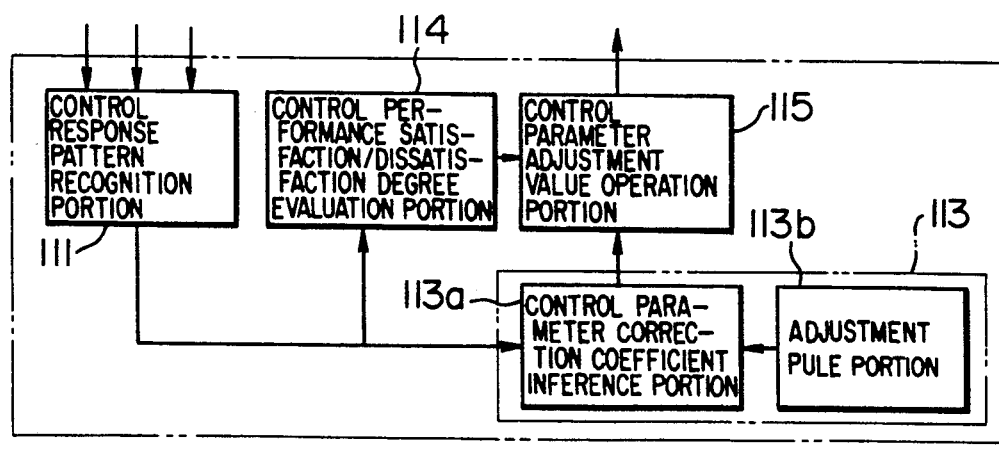
FIG. 26 is a block diagram showing the configuration of a further embodiment of the self-tuning portion according to the present invention.
Figure 27:
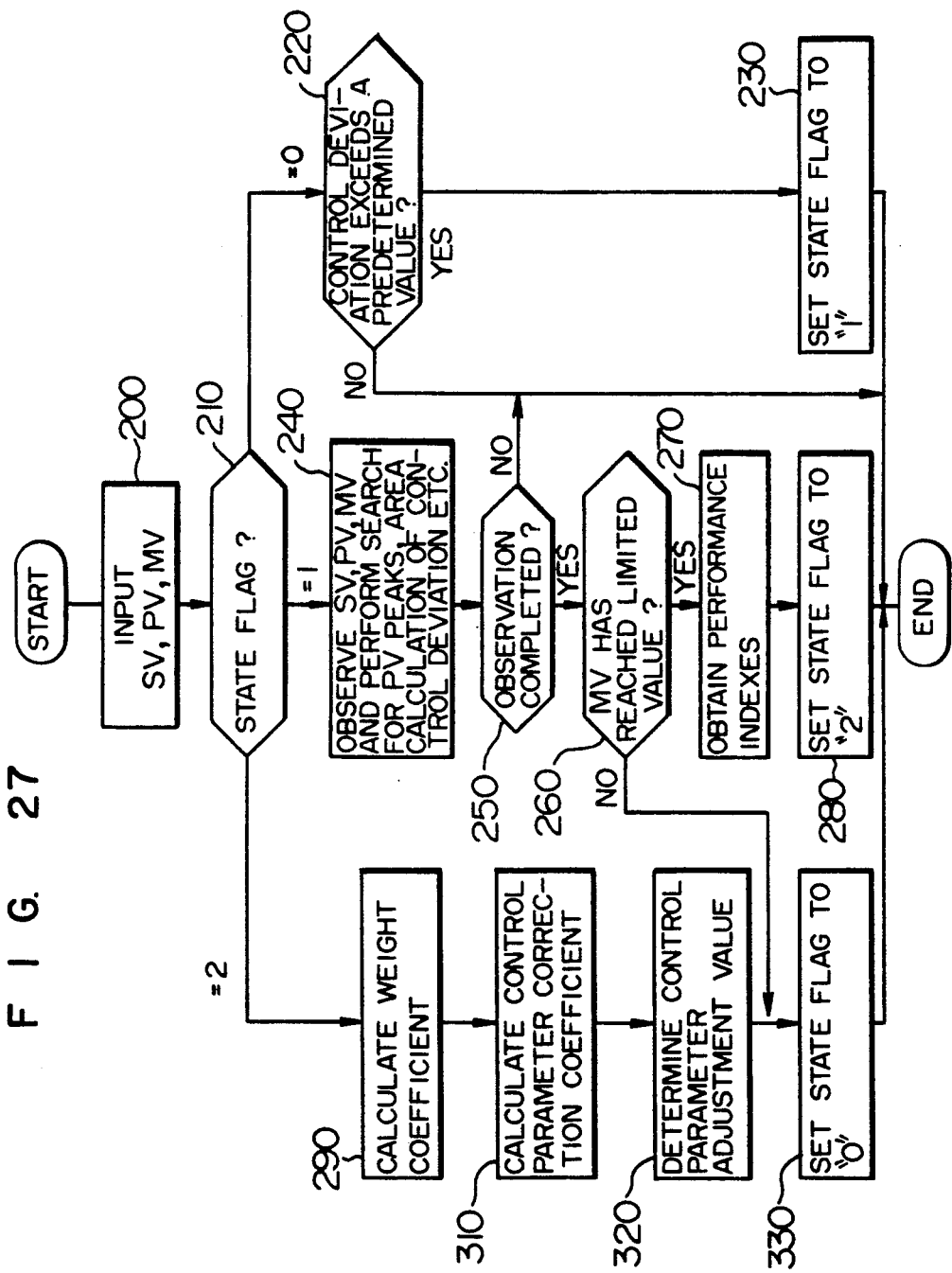
FIG. 27 is a schematic flowchart for explaining the processing in an self-tuning cascade controller to which the self-tuning portion of FIG. 26 is applied.

FIG. 26 shows the functional configuration of control parameter self-tuning portions 105 and 106 in an embodiment of the process control system according to the present invention. FIG. 27 is a schematic flowchart for explaining the processing of the self-tuning portions 105 and 106. In FIGS. 26 and 27, those the same as those in FIGS. 17, 18 and 24 are referenced correspondingly. The embodiment of FIG. 26 is different from that of FIGS. 17 and 18 in that the control performance judgement portions 112 and 122 are omitted, and the control parameter correction portions 113 and 123, control performance satisfaction/dissatisfaction degree evaluation portions 114 and 124, and control parameter adjustment value operation portions 115 and 125 are made to function even when performance indexes obtained in the control response pattern recognition portions 111 and 121 satisfy their target control specifications.

In this embodiment, although it is possible to obtain the same effect as that of the foregoing embodiment, there is a disadvantage in that the load factor of a microcomputer is made high in comparison with the foregoing embodiment because even when the control performance satisfies a target control specification, all the functions are executed. The essence of the present invention, however, never changes because of such a disadvantages.

In the first self-tuning portion 105, the essence of the present invention never changes in the case where the settling time ratio which is the ratio between the preceding and current time values of the controlled variable rise time (for example, the first peak generation time in the case of changing the set-point) or of the controlled settling time is used as the third performance index in the control response pattern recognition portion 111; or in the case where the control area damping ratio is used as the second performance index, which control area damping ratio is obtained in a manner so that the time quadrature value of the absolute value of the control deviation is successively obtained, in addition to the peak search of PV, in the same manner as in the control response pattern recognition portion 121 of the second self-tuning portion 106, and the sum of the time quadrature values in odd numbers except the first time quadrature value is divided by the sum of the time quadrature values in even numbers to thereby obtain the control area damping ratio. In the case of the second self-tuning portion 106, the essence of the present invention never changes in the case where the sum of the time quadrature values of the absolute value of the control deviation is obtained and the total control area ratio which is the ratio between the preceding and current values of the sum of the time quadrature values is used as the second performance index. Further although the shape of each of the membership functions is triangle in the control parameter correction portions 113 and 123, the membership function is not always limited to this shape, and the essence of the present invention never changes even in the case where a quadratic curved line or an exponential curve line is employed as the shape. Further, the essence of the present invention never changes not only in the case where the shape of the membership function is desirely changed but in the case where the number of the membership functions is desirably set. Moreover, the essence of the present invention never changes even in the case where all the performance indexes are used to make the evaluation severe in the control performance judgement portions 112 and 122 and the control performance satisfaction/dissatisfaction degree evaluation portions 114 and 124.

In this embodiment, there are the following effects.
(1) Since the control parameter of a plurality of PID or PI controllers can be automatically tuned parallelly, it is possible to considerably reduce adjustment work by an operator and to eliminate an individual variation in adjustment results.
(2) Since no identifying signal is used, control parameters can be tuned in an optimum manner without disturbing the process.
(3) Since a change of dynamic characteristics of the process can be rapidly detected without troubling hands, the control characteristics can be always kept in the optimum state.

We claim:

1. A self-tuning controller apparatus comprising:
   a controller connected to a process for controlling said process;
   a control response pattern recognition means for receiving a set-point and a controlled variable and for obtaining a plurality of performance indexes from a controlled variable response pattern generated in response to a change in said set-point or a disturbance;
   a parameter correction means for qualitatively evaluating said plurality of performance indexes and for inferring correction values of control parameters on the basis of the result of evaluation;
   a satisfaction/dissatisfaction degree evaluation means for evaluating satisfaction or dissatisfaction degrees for target control specifications of at least two of said plurality of performance indexes and for obtaining a weight coefficient of the inferred correction value of said control parameter in accordance with the evaluated satisfaction or dissatisfaction degrees; and
   a parameter adjustment value operation means responsive to said parameter correction means and said satisfaction/dissatisfaction degree evaluation means for calculating an adjustment value of said control parameter and for correcting said control parameters of said controller to the calculated adjustment value.

2. A self-tuning controller apparatus according to claim 1, in which said plurality of performance indexes include three performance indexes, and in which said satisfaction/dissatisfaction degree evaluation means evaluates the satisfaction or dissatisfaction degrees for the target control specifications of first and second ones of said three performance indexes and compares the respective evaluated satisfaction or dissatisfaction degrees so as to select the smaller one of the compared values in the case of satisfaction degree comparison and to select the larger one of the compared valued in the case of dissatisfaction degree comparison, and wherein in dependence upon the larger the selected value is in the case of satisfaction degree evaluation or the smaller the selected value is in the case of dissatisfaction degree evaluation, said weight coefficient is adjusted to be smaller.

3. A self-tuning controller apparatus according to claim 2, in which said satisfaction/dissatisfaction degree evaluation means includes a fuzzy inference means.

4. A self-tuning controller apparatus according to claim 1, in which said plurality of performance indexes include three performance indexes, a first one of said three performance indexes being an overshoot quantity indicated by said controlled variable response pattern, a second one of said three performance indexes being an amplitude damping ratio indicated by said controlled variable response pattern.

5. A self-tuning controller apparatus according to claim 4, in which a third one of said the performance indexes is an oscillation period ratio which is a ratio of a preceding value to a current value of an oscillation period indicated by said controlled variable response.

6. A self-tuning controller apparatus according to claim 4, in which a third one of said three performance indexes is a rise time ratio which is a ratio of a preceding value to a current value of a rise time of said controlled variable response.

7. A self-tuning controller apparatus according to claim 4, which a third one of said three performance indexes is a settling time ratio which is a ratio of a preceding value to a current value of a settling time of said controlled variable response.

8. A self-tuning controller apparatus according to claim 1, in which said parameter correction means includes a plurality of performance index evaluating means for respectively qualitatively evaluating the magnitudes of the respective performance indexes and an adjustment rule for inferring said control parameter correction value on the basis of the relationship among the qualitative evaluation of said performance indexes.

9. A self-tuning controller apparatus according to claim 1, in which said controller includes a PID controller for performing proportional control, integration control and differential control on said process.

10. A self-tuning controller apparatus according to claim 1, further comprising a control performance judgement means for judging whether or not said at least two performance indexes satisfy said target control specifications and for actuating said parameter correction means, said satisfaction/dissatisfaction degree evaluation means, and said parameter adjustment value operation means in the case where said at least two performance indexes do not satisfy said target control specifications.

11. A process control system connected to a plurality of linked processes, said process control system comprising:
    a plurality of vertically distributed control elements provided respectively corresponding to said processes;
    each of said control elements including: a controller; and a self-tuning means for receiving a set-point and a controlled variable for the process associated with said controller and for adjusting a control parameter of said controller in an optimum manner;
    each of said self-tuning means having: means for estimating, through inference, a correction coefficient of said control parameter on the basis of a predetermined adjustment rule from performance indexes obtained from a controlled variable response pattern generated in response to a change of said set-point or a disturbance; and
    means for judging satisfaction or dissatisfaction degrees for target specifications of said performance indexes and for correcting said correction coefficient in accordance with said satisfaction or dissatisfaction degrees whereby said self-tuning means operates autonomously.

12. A process control system according to claim 11, in which said plurality of control elements include a first control element having its own set-point which is an externally given set-point, and a second control element having its own set-point which is an output of said first control element.

13. A process control system according to claim 12, in which said self-tuning means included in said first control element includes: a control response pattern recognition means for receiving a set-point and a control parameter inputted to said first control element and for obtaining first, second and third control performance indexes from a control response pattern generated upon occurrence of a change in said set-point or upon application of a disturbance; a control parameter correction coefficient inference means for receiving said first, second and third control performance indexes and for obtaining a correction coefficient of said control parameter through fuzzy inference on the basis of an adjustment rule qualitatively representing a relationship among the respective magnitudes of said first, second and third performance indexes and the magnitude of the correction coefficient of the control parameter of said first control element; a satisfaction/dissatisfaction degree evaluation means for obtaining a weight coefficient in accordance with an actual control performance satisfaction degree or dissatisfaction degree for a target control performance through fuzzy inference on the basis of a predetermined evaluation rule from at least said first and second performance indexes; and a control parameter adjustment value operation means for obtaining an adjustment value of said control parameter from said control parameter correction coefficient, said weight coefficient, and a current value of said control parameter.

14. A process control system according to claim 13, in which said self-tuning means included in said first control element receives a manipulated variable which is an output of said first control element, and in which said control response pattern recognition means of said first control element includes an actuation means for always monitoring the set-point and controlled variable of said first control element and for observing the set-point, controlled variable, and manipulated variable before the controlled variable is settled to the set-point after a control deviation exceeds a predetermined value so that said actuation means obtains said first, second and third performance indexes and actuates said control parameter correction coefficient inference means, said satisfaction/dissatisfaction degree evaluation means, and said control parameter adjustment value operation means when an observation value of said manipulated variable does not reach a predetermined limit value.

15. A process control system according to claim 13, in which said satisfaction/dissatisfaction degree evaluation means included in said first control element makes a comparison between the satisfaction or dissatisfaction degree of a first observation value of said first performance index for a target specification of said first performance index and the satisfaction or dissatisfaction degree of a second observation value of said second performance index for a target specification of said second performance index and selects the smaller one of said first and second observation values in the case of satisfaction degree comparison while selecting the larger one of said first and second observation values in the case of dissatisfaction degree comparison and adjusts said weight coefficient to be smaller in dependence upon the larger the selected value is in the case of satisfaction degree evaluation or the smaller the selected value is in the case of dissatisfaction evaluation.

16. A process control system according to claim 13, in which in said control response pattern recognition means of said first control element, said first performance index is an overshoot value indicated by said control response pattern and said second performance index is an amplitude damping ratio indicated by said control response pattern.

17. A process control system according to claim 16, in which said third performance index of said control response pattern recognition means included in said first control element is an oscillation period ratio which is a ratio between preceding and current values of an oscillation period indicated by said control response pattern.

18. A process control system according to claim 16, in which said third performance index of said control response pattern recognition means included in said first control element is a rise time ratio which is a ratio between preceding and current values of a rise time indicated by said control response pattern.

19. A process control system according to claim 16, in which said third performance index of said control response pattern recognition means included in said first control element is a settling time ratio which is a ratio between preceding and current values of a settling time indicated by said control response pattern.

20. A process control system according to claim 16, in which said control response pattern recognition means included in said first control element obtains a time quadrature value of an absolute value of a control deviation in a process of observation of control response successively only for a period where a control deviation of the same polarity continues, and in which said second performance index is a control area damping ratio obtained by dividing a sum of all the obtained time quadrature values in odd numbers except the first time quadrature value by a sum of all the obtained time quadrature values in even numbers, and said third performance index is a total control area ratio which is a ratio between preceding and current values of a sum of all the obtained time quadrature values.

21. A process control system according to claim 13, further comprising a control performance judgement means for receiving at least said first and second performance indexes and determining whether said first and second performance indexes satisfy said target specifications and actuating said control parameter correction coefficient inference means, said satisfaction/dissatisfaction degree evaluation means, and said control parameter adjustment value operation means when said first and second performance indexes do not satisfy said target specifications.

22. A process control system according to claim 21, in which said self-tuning means included in said first control element receives a manipulated variable which is an output of said first control element, and in which said control response pattern recognition means of said first control element always monitors the set-point and controlled variable of said first control element and observes the set-point, controlled variable, and manipulated variable before the controlled variable is settled to the set-point after a control deviation exceeds a predetermined value so that said control response pattern recognition means obtains said first, second and third performance indexes and actuates said control parameter correction coefficient inference means, said satisfaction/dissatisfaction degree evaluation means, and said control parameter adjustment value operation means when an observation value of said manipulated variable does not reach a predetermined limit value.

23. A process control system according to claim 1, in which said satisfaction/dissatisfaction degree evaluation means included in said first control element makes a comparison between the satisfaction or dissatisfaction degree of a first observation value of said first performance index for a target specification of said first performance index and the satisfaction or dissatisfaction degree of a second observation value of said second performance index for a target specification of said second performance index so that said satisfaction/dissatisfaction degree evaluation means selects the smaller one of said first and second observation values in the case of satisfaction degree comparison while selects the larger one of said first and second observation values in the case of dissatisfaction degree comparison to thereby determine said weight coefficient so that the larger the selected value is in the case of satisfaction degree comparison while the smaller the selected value is in the case of dissatisfaction degree comparison, the smaller said weight coefficient is made.

24. A process control system according to claim 21, in which in said control response pattern recognition means included in said first control element, said first performance index is an overshoot value indicated by said control response pattern and said second performance index is an amplitude damping ratio indicated by said control response pattern.

25. A process control system according to claim 24, in which said third performance index of said control response pattern recognition means included in said first control element is an oscillation period ratio which is a ratio between preceding and current values of an oscillation period indicated by said control response pattern.

26. A process control system according to claim 25, in which said control response pattern recognition means included in said first control element obtains a time quadrature value of an absolute value of a control deviation in a process of observation of control response successively only for a period where a control deviation of the same polarity continues, and in which said second performance index is a control area damping ratio obtained by dividing a sum of all the obtained time quadrature values in odd numbers except the first time quadrature value by a sum of all the obtained time quadrature values in even numbers, and said third performance index is a total control area ratio which is a ratio between preceding and current values of a sum of all the obtained time quadrature values.

27. A process control system according to claim 24, in which said control response pattern recognition means obtains a time quadrature value of an absolute value of a control deviation in a process of observation of control response successively only for a period where a control deviation of the same polarity continues, and in which said second performance index is a control area damping ratio obtained by dividing a sum of the third and fourth ones of the obtained time quadrature values by a sum of the second and third ones of the obtained time quadrature values.

28. A process control system according to claim 25, in which said third performance index of said control response pattern recognition means is a rise time ratio which is a ratio between preceding and current values of a rise time.

29. A process control system according to claim 25, in which said third performance index of said control response pattern recognition means is a setting time ratio which is a ratio between preceding and current values of a settling time.

30. A process control system according to claim 12, in which said self-tuning means included in said second control element includes: a control response pattern recognition means for receiving a set-point and a control parameter inputted to said second control element and for obtaining first and second performance indexes from a control response pattern generated upon occurrence of a change in said set-point or upon application of a disturbance; a control parameter correction coefficient inference means for receiving said first and second performance indexes and for obtaining a correction coefficient of said control parameter through fuzzy inference on the basis of an adjustment rule qualitatively representing a relationship between the respective magnitudes of said first and second performance indexes and the magnitude of the correction coefficient of the control parameter of said second control element; a satisfaction/dissatisfaction degree evaluation means for obtaining a weight coefficient in accordance with an actual control performance satisfaction or dissatisfaction degree for a target control performance through fuzzy inference on the basis of a predetermined evaluation rule from at least said first performance index; and a control parameter adjustment value operation means for obtaining an adjustment value of said control parameter from said control parameter correction coefficient, said weight coefficient, and a current value of said control parameter.

31. A process control system according to claim 30, in which said self-tuning means included in said second control element receives a manipulated variable which is an output of said first control element, and in which said control response pattern recognition means of said second control element includes an actuation means for always monitoring the set-point and controlled variable of said second control element and for observing the set-point, controlled variable, and manipulated variable before the controlled variable is settled to the set-point after a control deviation exceeds a predetermined value so that said actuation means obtains said first and second performance indexes and actuates said control parameter correction coefficient inference means, said satisfaction/dissatisfaction degree evaluation means, and said control parameter adjustment value operation means when an observation value of said manipulated variable does not reach a predetermined limit value.

32. A process control system according to claim 30, in which said control response pattern recognition means obtains a time quadrature value of an absolute value of a control deviation in a process of observation of control response successively only for a period where a control deviation of the same polarity continues, and in which said first performance index is a control area damping ratio obtained by dividing a sum of all the obtained time quadrature values in even numbers by a sum of all the obtained time quadrature values in odd numbers, and said second performance index is a total control area ratio which is a ratio between preceding and current values of a sum of all the obtained time quadrature values.

33. A process control system according to claim 30, in which said control response pattern recognition means obtains a time quadrature value of an absolute value of a control deviation in a process of observation of control response successively only for a period where a control deviation of the same polarity continues, and in which said first performance index is a control area damping ratio obtained by dividing a sum of all the obtained time quadrature values in even numbers by a sum of all the obtained time quadrature values in odd numbers, and said second performance index is a ratio between preceding and current values of a settling time.

34. A process control system according to claim 30, in which said self-tuning means includes a control performance judgement means for actuating said control parameter correction coefficient inference means, said satisfaction/dissatisfaction degree evaluation means, and said control parameter adjustment value operation means when at least said first performance index does not satisfy said target specification thereof.

35. A process control system according to claim 34, in which said self-tuning means of said second control element receives a manipulated variable which is an output of said second control element, and in which said control response pattern recognition means of said second control element always monitors the set-point and controlled variable of said second control element and observes the set-point, controlled variable, and manipulated variable before the controlled variable is settled to the set-point after a control deviation exceeds a predetermined value so that said control response pattern recognition means obtains said first and second performance indexes and actuates said control parameter correction coefficient inference means, said satisfaction/dissatisfaction degree evaluation means, and said control parameter adjustment value operation means when an observation value of said manipulated variable does not reach a predetermined limit value.

36. A process control system according to claim 34, in which said control response pattern recognition means obtains a time quadrature value of an absolute value of a control deviation in a process of observation of control response successively only for a period where a control deviation of the same polarity continues, and in which said first performance index is a control area damping ratio obtained by dividing a sum of all the obtained time quadrature values in even numbers by a sum of all the obtained time quadrature values in odd numbers, and said second performance index is a total control area ratio which is a ratio between preceding and current values of a sum of all the obtained time quadrature values.

37. A process control system according to claim 36, in which said second performance index of said control response pattern recognition means is a settling time ratio which is a ratio between preceding and current values of a settling time.

38. A process control system according to claim 12, in which said self-tuning means of said first control element includes means for adjusting the control parameter of said first control element in an optimum manner by using peak search values of the control response pattern, and in which said self-tuning means of said second control element includes means for adjusting the control parameter of said second control element in an optimum manner by using time quadrature values of a control deviation between the set-point and controlled variable of said second control element.

* * * * *